(12) United States Patent  
Kato et al.

(10) Patent No.: US 11,186,256 B2  
(45) Date of Patent: Nov. 30, 2021

(54) VEHICLE WIRELESS KEY APPARATUS

(71) Applicant: SUBARU CORPORATION, Tokyo (JP)

(72) Inventors: Toru Kato, Tokyo (JP); Masato Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/845,844

(22) Filed: Apr. 10, 2020

(65) Prior Publication Data

US 2021/0039594 A1 Feb. 11, 2021

(30) Foreign Application Priority Data

Aug. 6, 2019 (JP) .............................. JP2019-144206

(51) Int. Cl.
*B60R 25/24* (2013.01)
*H04W 12/06* (2021.01)
*H04W 12/041* (2021.01)

(52) U.S. Cl.
CPC ........... *B60R 25/24* (2013.01); *H04W 12/041* (2021.01); *H04W 12/06* (2013.01)

(58) Field of Classification Search
None
See application file for complete search history.

(56) References Cited

U.S. PATENT DOCUMENTS

2016/0036788 A1* 2/2016 Conrad ................. H04W 12/06
713/168

FOREIGN PATENT DOCUMENTS

JP 2016-188540 A 11/2016

* cited by examiner

*Primary Examiner* — Adolf Dsouza
(74) *Attorney, Agent, or Firm* — McDermott Will & Emery LLP

(57) ABSTRACT

A vehicle wireless key apparatus includes a wireless key memory, a terminal information memory, and a memory updating unit. The wireless key memory is provided in a vehicle. Key identification information of a wireless key of the vehicle is to be registered in the wireless key memory. Terminal identification information of a mobile terminal is to be registered in the terminal information memory. The mobile terminal is used separately from the wireless key. The memory updating unit is configured to perform update of the key identification information registered in the wireless key memory. The memory updating unit is configured to verify, upon the update, the mobile terminal against the terminal identification information registered in the terminal information memory.

11 Claims, 6 Drawing Sheets

VEHICLE WIRELESS KEY APPARATUS

CROSS-REFERENCE TO RELATED APPLICATIONS

The present application claims priority from Japanese Patent Application No. 2019-144206 filed on Aug. 6, 2019, the entire contents of which are hereby incorporated by reference.

BACKGROUND

The technology relates to a vehicle wireless key apparatus.

For a vehicle, a wireless key may be used, for example, in order to lock or unlock a door of the vehicle or in order to start or stop a power source of the vehicle. Non-limiting examples of the vehicle may include an automobile. In this case, the vehicle may be provided with a wireless key apparatus, for example, as disclosed in Japanese Unexamined Patent Application Publication No. 2016-188540.

SUMMARY

An aspect of the technology provides a vehicle wireless key apparatus that includes a wireless key memory, a terminal information memory, and a memory updating unit. The wireless key memory is provided in a vehicle. Key identification information of a wireless key of the vehicle is to be registered in the wireless key memory. Terminal identification information of a mobile terminal is to be registered in the terminal information memory. The mobile terminal is used separately from the wireless key. The memory updating unit is configured to perform update of the key identification information registered in the wireless key memory. The memory updating unit is configured to verify, upon the update, the mobile terminal against the terminal identification information registered in the terminal information memory.

An aspect of the technology provides a vehicle wireless key apparatus that includes a wireless key memory, a terminal information memory, and circuitry. The wireless key memory is provided in a vehicle. Key identification information of a wireless key of the vehicle is to be registered in the wireless key memory. Terminal identification information of a mobile terminal is to be registered in the terminal information memory. The mobile terminal is used separately from the wireless key. The circuitry is configured to perform update of the key identification information registered in the wireless key memory. The circuitry is configured to verify, upon the update, the mobile terminal against the terminal identification information registered in the terminal information memory.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
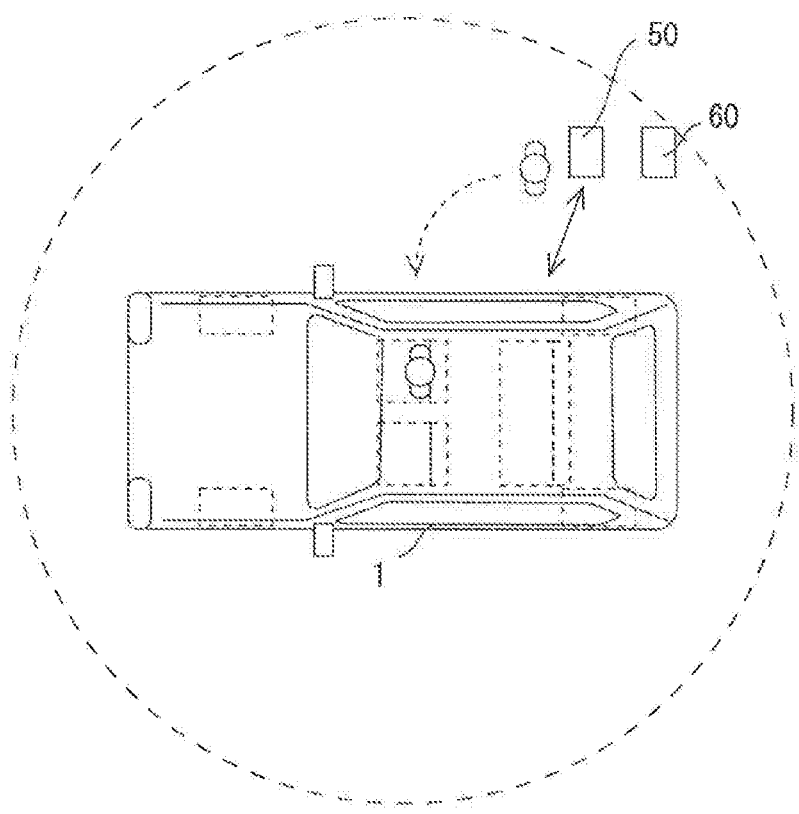
FIG. 1 is an explanatory diagram illustrating an example of an automobile to which a wireless key apparatus according to one embodiment of the technology is applicable.

In a wireless key apparatus, key identification information of a wireless key usable for a vehicle may be registered in a key memory. When a user, such as an occupant using the vehicle, operates the wireless key, the wireless key may transmit the key identification information. The wireless key apparatus may receive the key identification information and verify the received key identification information against key identification information registered in advance in the key memory. When the received key identification information matches the key identification information registered in advance, the wireless key device may supply the vehicle with, for example, permission for starting a power source of the vehicle.

Regarding such a wireless key apparatus, it may be necessary to make registration of key identification information of a new wireless key in a key memory difficult so that not everyone can perform the registration anytime.

The wireless key apparatus may therefore perform verification against an already-registered wireless key in the key memory when the wireless key apparatus registers the new wireless key or deletes the already-registered wireless key. This allows the wireless key apparatus to confirm that a person such as a user who is accessible to the already-registered wireless key is trying to register a new wireless key or to delete the already-registered wireless key, being aware of what he or she is doing.

Some users, however, may lose all of a plurality of wireless keys provided together with the vehicle.

In this case, the user does not have the already-registered wireless key and may therefore not able to register a new wireless key. In order for the user to continue using the vehicle, it may be necessary to replace the wireless key apparatus as a whole. The wireless key apparatus may be, however, attached to the vehicle at a position or attached in a state which makes it difficult to replace the wireless key apparatus in order to prevent from being theft or being replaced. As a result, the replacement of the wireless key apparatus as a whole may cost the user a lot.

It is desired to improve user friendliness while securing high security in a vehicle wireless key apparatus.

In the following, some embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

FIG. 1 illustrates an example of an automobile 1 to which a wireless key apparatus according to one embodiment of the technology is applicable.

In one embodiment, the automobile 1 illustrated in FIG. 1 may serve as a "vehicle".

FIG. 1 also illustrates a user in addition to the automobile 1. The user may be, for example but not limited to, an occupant of the automobile 1. The user may use a key device 50 outside the automobile 1. In one embodiment, the key device 50 may serve as a "wireless key". In one example, the automobile 1 may be provided with a wireless key apparatus 40 as will be described later. In a wireless key memory 81 in the wireless key apparatus 40, key identification information of the key device 50 usable for the automobile 1 may be registered. In one example, when the user, who is the occupant to use the automobile 1, operates the key device 50, the key device 50 may wirelessly transmit the key identification information. In another example, when the user with the key device 50 approaches the automobile 1, the key device 50 may receive one of polling signals periodically transmitted from the wireless key apparatus 40 and wirelessly transmit the key identification information of the key device 50 in response to the received polling signal. The wireless key apparatus 40 may receive the key identification information transmitted from the key device 50, and verify the received key identification information against the key identification information registered in advance in the wireless key memory 81. When the received key identification information matches the registered key identification information registered in advance, the wireless key apparatus 40 may supply each unit of the automobile 1 with, for example but not limited to, permission to start a power source of the automobile 1 or an instruction to unlock a door of the automobile 1. This allows the user to enter and use the automobile 1.

Figure 2:
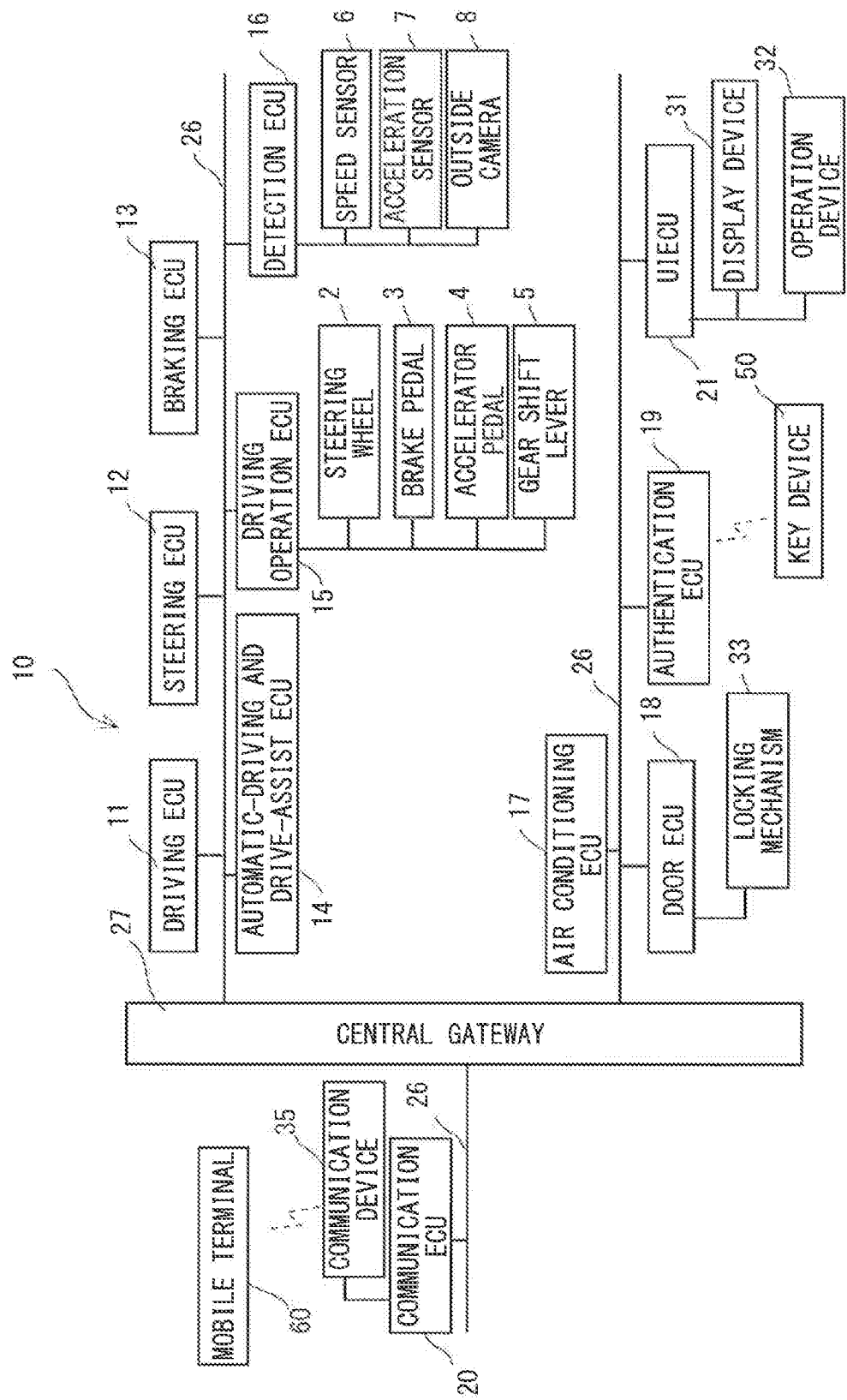
FIG. 2 is an explanatory diagram illustrating an example of a control system of an automobile illustrated in FIG. 1.

FIG. 2 illustrates an example of a control system 10 of the automobile 1 illustrated in FIG. 1.

FIG. 2 illustrates a plurality of electronic control units (ECUs) representing respective control modules included in the control system 10 of the automobile 1. The illustrated ECUs may each be built-in in the corresponding control module.

For example, FIG. 2 illustrates a driving ECU 11, a steering ECU 12, a braking ECU 13, an automatic-driving and drive-assist ECU 14, a driving operation ECU 15, a detection ECU 16, an air conditioning ECU 17, a door ECU 18, an authentication ECU 19, a communication ECU 20, a user interface (UI) ECU 21, and a system ECU 22. The above-mentioned ECUs may be coupled to a central gateway (CGW) 27 by means of a vehicle network 26. The CGW 27 may serve as a relay device. Non-limiting examples of the vehicle network 26 may include a controller area network (CAN) and a local interconnect network (LIN), which is used in the automobile 1.

The ECU in each control module may be coupled to an electronic device to be used in the automobile 1. When being started, the ECU may execute various processes to control operation of the coupled electronic device on the basis of information or data acquired from the vehicle network 26. The ECU may also supply the information or data such as an operating state of the coupled electronic device to the vehicle network 26.

The driving operation ECU 15 may be coupled to, for example but not limited to, operation detecting sensors such as a steering wheel 2, a brake pedal 3, an accelerator pedal 4, and a gear shift lever 5 which the occupant operates to control traveling of the automobile 1. The driving operation ECU 15 may supply control information based on an amount of the operation to the vehicle network 26. The driving ECU 11, the steering ECU 12, and the braking ECU 13 may each acquire information from the vehicle network 26 and control starting or stopping of the power source of the automobile 1 and traveling of the automobile 1.

The detection ECU 16 may be coupled to, for example but not limited to, a speed sensor 6 of the automobile 1, an acceleration sensor 7, an outside camera 8, and any other suitable device. The acceleration sensor 7 may detect acceleration upon contact of the automobile 1 with any other object. The outside camera 8 may capture an image outside the automobile 1. The detection ECU 16 may supply the vehicle network 26 with values obtained from the speed sensor 6 and the acceleration sensor 7 of the automobile 1, an image from the outside camera 8, or any other suitable information or data. The CGW 27 may relay information. The UIECU 21 may acquire information from the vehicle network 26 and display the information on a display device 31. The display device 31 may be coupled to the UIECU 21. An operation device 32 to be operated by the occupant may also be coupled to the UIECU 21 in addition to the display device 31.

The authentication ECU 19 may control the wireless key apparatus 40. The authentication ECU 19 may receive the key identification information from the key device 50 and authenticate the user on the basis of matching of the key identification information. The authentication ECU 19 may supply a result of the authentication to the vehicle network 26.

The door ECU 18 may be coupled to a locking mechanism 33 for a part such as the door or a hatch back of the automobile 1. The door ECU 18 may acquire the result of the authentication from the vehicle network 26. When acquiring the result of authentication indicating matching, the door ECU 18 may control the locking mechanism 33 to unlock the part such as the door or the hatch back of the automobile 1. When acquiring the result of authentication directed to locking, the door ECU 18 may control the locking mechanism 33 to lock the part such as the door or the hatch back of the automobile 1.

The communication ECU 20 may directly perform wireless communication with a mobile terminal 60 that is present outside the automobile 1. In one example, the communication ECU 20 may indirectly perform wireless communication with the mobile terminal 60 via an unillustrated communication base station.

Figure 3:
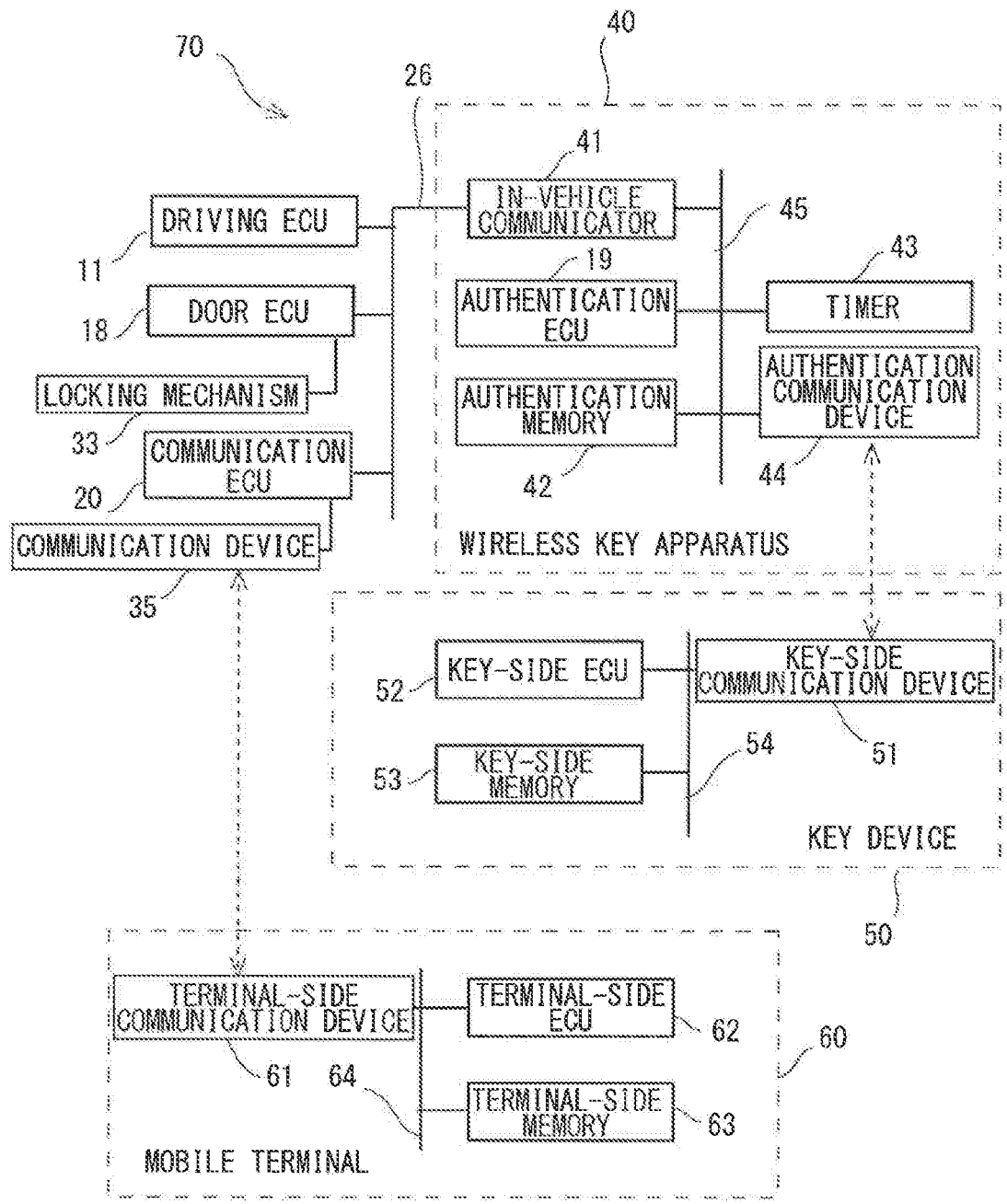
FIG. 3 is an explanatory diagram illustrating an example of a wireless key apparatus applied to the automobile illustrated in FIG. 1 and peripheral devices of the wireless key apparatus.

FIG. 3 illustrates an example of the wireless key apparatus 40 which is applicable to the automobile 1 illustrated in FIG. 1 and peripheral devices of the wireless key apparatus 40.

FIG. 3 illustrates the wireless key apparatus 40 as being coupled to each of the driving ECU 11, the door ECU 18, and the communication ECU 20 by means of the vehicle network 26.

FIG. 3 also illustrates the key device 50 and the mobile terminal 60 that are to be carried and used by the user, in addition to the wireless key apparatus 40. The wireless key apparatus 40, the key device 50, and the mobile terminal 60 may be included in a vehicle wireless key system 70 according to one example embodiment.

The wireless key apparatus 40 illustrated in FIG. 3 may include, for example but not limited to, an in-vehicle communicator 41, the authentication ECU 19, an authentication memory 42, a timer 43, an authentication communication device 44, and an internal bus 45. The internal bus 45 may couple the in-vehicle communicator 41, the authentication ECU 19, the authentication memory 42, the timer 43, and the authentication communication device 44 to each other.

The timer 43 may measure an elapsed time period or time.

The authentication communication device 44 may perform wireless communication with the key-side communication device 51 of the key device 50. Non-limiting examples of a carrier wave to be used for the wireless communication may include a low-frequency (LF) carrier wave, a radio-frequency (RF) carrier wave, a Bluetooth (registered trademark) carrier wave, and a carrier wave of any other communication system. The key device 50 may include, for example but not limited to, a key-side communication device 51, a key-side ECU 52, a key-side memory 53, and a key-side bus 54. The key-side bus 54 may couple the key-side communication device 51, the key-side ECU 52, and the key-side memory 53 to each other. The key-side memory 53 may hold a program and data of the key device 50. The key-side ECU 52 may read the program from the key-side memory 53 to execute the program. This may implement a controller of the key device 50.

The in-vehicle communicator 41 may be coupled to the vehicle network 26. The in-vehicle communicator 41 may supply information or data to and receive information or data from another ECU such as the driving ECU 11, the door ECU 18, or the communication ECU 20 as illustrated in FIG. 3 via the vehicle network 26. The communication ECU 20 may cause the communication device 35 to perform direct or indirect communication with a terminal-side communication device 61 of the mobile terminal 60 used by the user. The mobile terminal 60 may include, for example but not limited to, the terminal-side communication device 61, a terminal-side ECU 62, a terminal-side memory 63, and a terminal-side bus 64. The terminal-side bus 64 may couple the terminal-side communication device 61, the terminal-side ECU 62, and the terminal-side memory 63 to each other. The terminal-side memory 63 may hold a program and data of the mobile terminal 60. The terminal-side ECU 62 may read the program from the terminal-side memory 63 to execute the program. This may implement a controller of the mobile terminal 60. Operation of a controller used in one example embodiment may be implemented by installing an application program corresponding to the operation on the mobile terminal 60 that is able to execute an operating system program. In this case, the operating system program and the application program may be stored in the terminal-side memory 63.

The authentication memory 42 may hold a program and data of the wireless key apparatus 40.

The authentication ECU 19 may read the program from the authentication memory 42 and execute the program. This may implement a controller of the wireless key apparatus 40.

In the wireless key apparatus 40, it may be necessary to make registration of key identification information of a new key device 50 in the authentication memory 42 difficult so that not everyone can perform the registration anytime.

To address this, the wireless key apparatus 40 may perform verification against a key device 50 already registered in the authentication memory 42 upon registration of the key identification information of the new key device 50 or deletion of the key identification information of the already-registered key device 50. This allows the wireless key apparatus 40 to confirm that a person such as a user who is accessible to the already-registered key device 50 is trying to register the new key device 50 or to delete the already-registered key device 50, being aware of what he or she is doing.

Some users, however, may lose all of the key devices 50 provided together with the automobile 1.

In this case, the user does not have the already-registered key device 50 and may therefore not able to register the new key device 50 or delete the already-registered key device 50. In order for the user to continue using the automobile 1, it may be necessary to replace the wireless key apparatus 40 as a whole. The wireless key apparatus 40 may be, however, attached to the automobile 1 at a position or attached in a state which makes it difficult to replace the wireless key apparatus 40 in order to prevent the wireless key apparatus 40 from being theft or being replaced. As a result, the replacement of the wireless key apparatus 40 as a whole may cost the user a lot.

It may be therefore desired to further improve user friendliness while securing high security in the wireless key apparatus 40 of the automobile 1.

Figure 4:
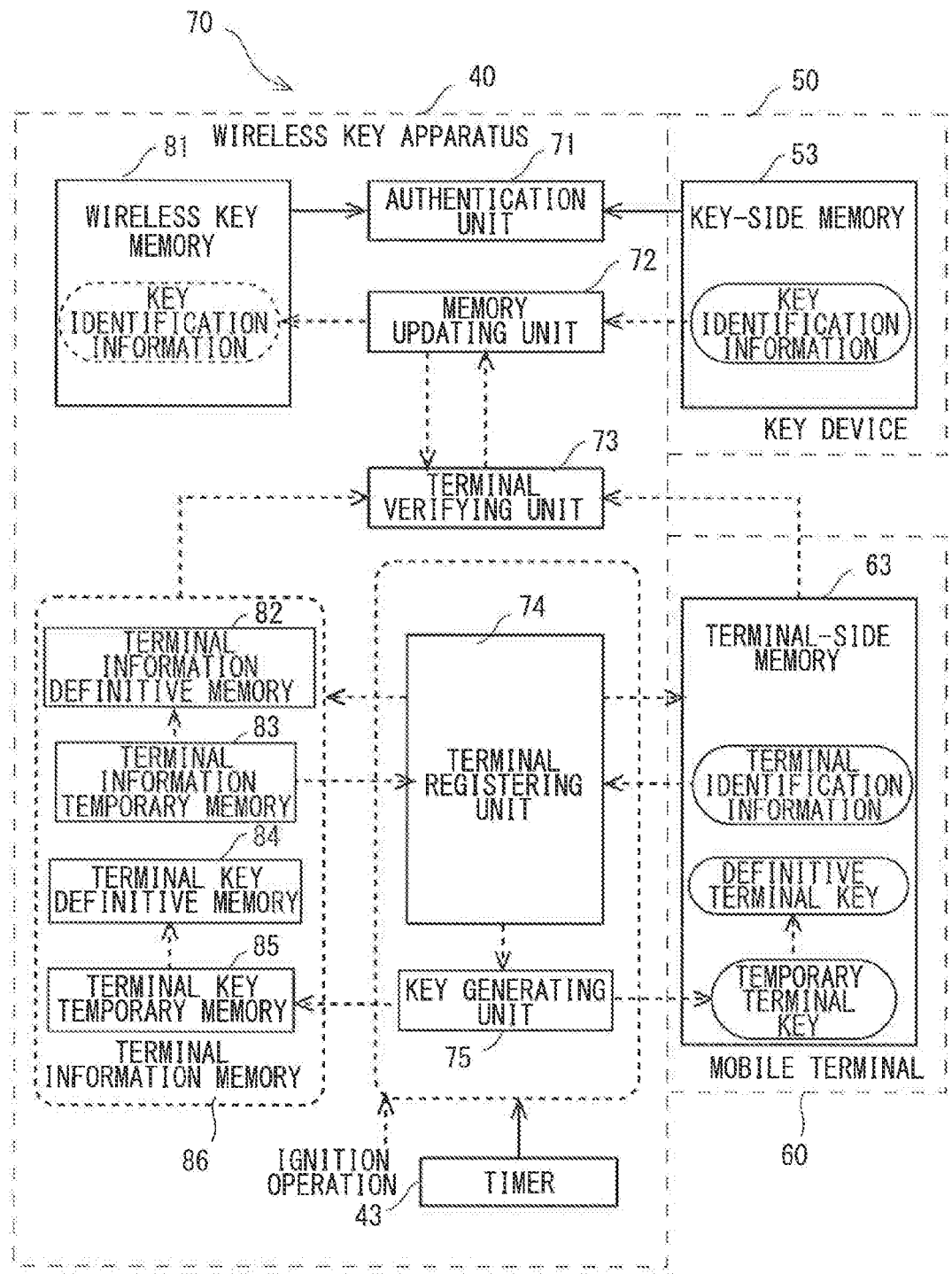
FIG. 4 is an explanatory diagram illustrating an example of main units and data included in a wireless key apparatus illustrated in FIG. 3.

FIG. 4 describes main units and data included in the wireless key apparatus 40 illustrated in FIG. 3.

As illustrated in FIG. 4, the wireless key apparatus 40 may include, for example but not limited to, an authentication unit 71, a memory updating unit 72, a terminal verifying unit 73, a terminal registering unit 74, and a key generating unit 75, as main units of the controller.

In the key-side memory 53 of the key device 50, key identification information uniquely provided to the key device 50 may be registered, as illustrated in FIG. 4.

The wireless key apparatus 40 may also include, as various memories implemented by the authentication memory 42, a wireless key memory 81, a terminal information definitive memory 82, a terminal information temporary memory 83, a terminal key definitive memory 84, and a terminal key temporary memory 85, as illustrated in FIG. 4.

In the terminal-side memory 63 of the mobile terminal 60, terminal identification information, a definitive terminal key, and a temporary terminal key may be registered. Non-limiting examples of the terminal identification information may include a communication ID uniquely provided to the mobile terminal 60. The definitive terminal key may be identification information uniquely issued in the present example embodiment.

In the wireless key memory 81, key identification information of a key device 50 authenticatable by the automobile 1 may be registered.

The terminal information definitive memory 82, the terminal information temporary memory 83, the terminal key definitive memory 84, and the terminal key temporary memory 85 may be included in a terminal information memory 86 in which the terminal identification information of the mobile terminal 60 is to be registered. The mobile terminal 60 may be used by the user separately from the key device 50.

Upon receiving the key identification information from the key device 50, the authentication unit 71 may verify the received key identification information against the key identification information already registered in the wireless key memory 81. When the received key identification information matches the already-registered key identification information, the authentication unit 71 may supply an authentication result indicating matching to the vehicle network 26.

The memory updating unit 72 may execute an update process on the wireless key memory 81. As the update process, the memory updating unit 72 may register new key identification information in the wireless key memory 81, delete already-registered pieces of key identification information one by one from the wireless key memory 81 to delete all of the already-registered pieces of key identification information from the wireless key memory 81. The memory updating unit 72 may perform verification of the mobile terminal 60 with the use of the terminal verifying unit 73.

The terminal verifying unit 73 may verify the mobile terminal 60 communicating with the communication device 35 against the information registered in the terminal information memory 86. The terminal verifying unit 73 may supply a verification result regarding the mobile terminal 60 to the memory updating unit 72 in response to a request from the memory updating unit 72. The terminal verifying unit 73 may be thereby allowed to verify the mobile terminal 60 communicating with the communication device 35 upon performing updating on the wireless key memory 81. In one example, the terminal verifying unit 73 may perform the verification against the information definitively registered in the terminal information memory 86 and the information definitively registered in the terminal-side memory 63.

The terminal registering unit 74 may manage a registration state of the mobile terminal 60 in the terminal information memory 86. In one example, the terminal registering unit 74 may manage registration of the mobile terminal 60 into the terminal information memory 86.

For example, the terminal registering unit 74 may receive the terminal identification information from the mobile terminal 60, and register the received terminal identification information in the terminal information temporary memory 83. When the terminal registering unit 74 receives the same terminal identification information from the mobile terminal 60 again, the terminal registering unit 74 may perform updating on the terminal information definitive memory 82 on the basis of the terminal identification information registered in the terminal information temporary memory 83. In this case, the terminal identification information of the mobile terminal 60 which has been confirmed a plurality of times by the terminal registering unit 74 may be registered in the terminal information definitive memory 82.

The terminal registering unit 74 may also manage a registration state of the terminal key in the terminal information memory 86 and the terminal-side memory 63. For example, the terminal registering unit 74 may register the terminal key in each of the mobile terminal 60 and the terminal information memory 86 in a temporary registration state or in a definitive registration state.

For example, the terminal registering unit 74 may supply a terminal key generated by the key generating unit 75 to the mobile terminal 60, and register the terminal key as a temporary terminal key in the terminal-side memory 63. The terminal registering unit 74 may also register the terminal key supplied to the mobile terminal 60 in the terminal key temporary memory 85. Further, the terminal registering unit 74 may definitively register the terminal key that has been temporarily registered in each of the terminal-side memory 63 of the mobile terminal 60 and the terminal information memory 86. This may cause the definitive terminal key to be registered in the terminal-side memory 63 of the mobile terminal 60. This may also cause the definitive terminal key to be registered in the terminal key definitive memory 84 of the terminal information memory 86.

The key generating unit 75 may perform a particular calculation process to generate a terminal key having a random value. Upon receiving an instruction from the terminal registering unit 74, the key generating unit 75 may generate a terminal key and supply the terminal key to the mobile terminal 60 with use of the communication device 35. This may cause a temporary terminal key or a definitive terminal key to be registered in the mobile terminal 60. Further, the key generating unit 75 may register the already-issued terminal key supplied to the mobile terminal 60 in the terminal key temporary memory 85.

Figure 5:
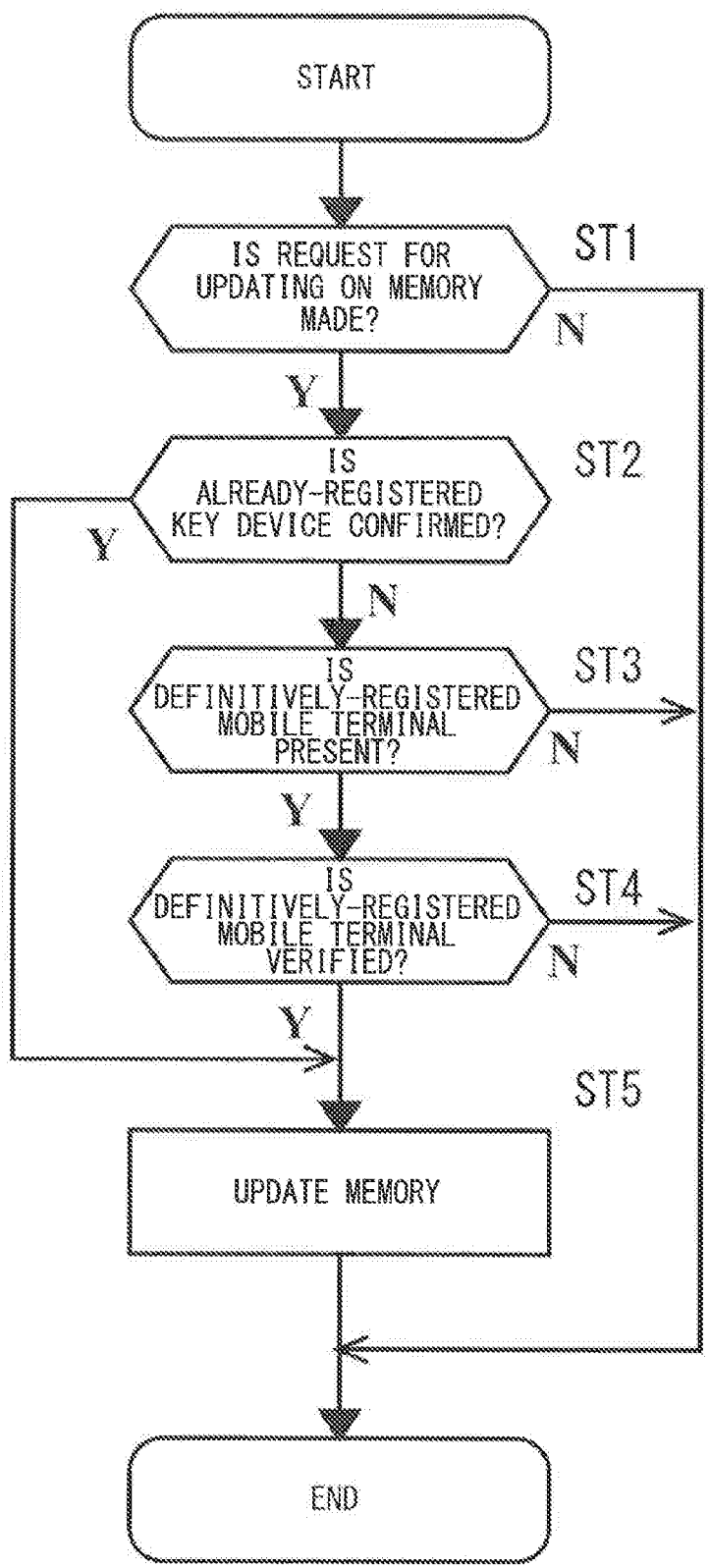
FIG. 5 is an explanatory diagram illustrating an example of an updating process on a wireless key memory.

FIG. 5 illustrates an example of the update process on the wireless key memory 81.

The update process on the wireless key memory 81 illustrated in FIG. 5 may be executed by the authentication ECU 19. In one embodiment, the authentication ECU 19 may serve as the memory updating unit 72 and the terminal verifying unit 73 illustrated in FIG. 4.

In step ST1, the authentication ECU 19 serving as the memory updating unit 72 may determine whether a request for updating on the wireless key memory 81 is made.

For example, the authentication ECU 19 may determine that the request for updating on the wireless key memory 81 is made in a case where a request for updating on a memory is acquired from an external device coupled to the vehicle network 26 (step ST1: Y), and cause the process to proceed to step ST2.

Otherwise, the authentication ECU 19 may determine that the request for updating on the wireless key memory 81 is not made (step ST1: N), and bring the update process on the wireless key memory 81 to an end.

In step ST2, the authentication ECU 19 serving as the memory updating unit 72 may determine whether the key device 50 whose key identification has been already registered in the wireless key memory 81 is confirmed.

For example, the authentication ECU 19 may cause the authentication communication device 44 to transmit a polling signal. In a case where the authentication communication device 44 does not receive any key identification information in response to the polling signal, the authentication ECU 19 may determine that the already-registered key device 50 is not confirmed.

When the authentication communication device 44 receives key identification information, the authentication ECU 19 may verify the received key identification information against the key identification information already registered in the wireless key memory 81. In a case where the matching key identification information is not registered in the wireless key memory 81, the authentication ECU 19 may determine that the already-registered key device 50 is not confirmed. In these cases, the authentication ECU 19 may cause the process to proceed to step ST3 because the already-registered key device 50 is not confirmed (step ST2: N).

In a case where the matching key identification information is registered in the wireless key memory 81, the authentication ECU 19 may determine that the already-registered key device 50 is confirmed (step ST2: Y). In this case, the authentication ECU 19 may cause the process to proceed to step ST5 because the already-registered key device 50 is confirmed.

In step ST3, the authentication ECU 19 serving as the memory updating unit 72 may determine whether the mobile terminal 60 registered in the terminal information memory 86 is present. For example, in a case where the terminal identification information is registered in the terminal information definitive memory 82 and the definitive terminal key is registered in the terminal key definitive memory 84, the authentication ECU 19 may acquire the already-registered state of the terminal identification information and the terminal key from the terminal verifying unit 73 and determine that the mobile terminal 60 definitively registered in the terminal information memory 86 is present (step ST3: Y). In this case, the authentication ECU 19 may cause the process to proceed to step ST4. Otherwise (step ST3: N), the authentication ECU 19 may bring the update process on the wireless key memory 81 illustrated in FIG. 5 to an end because the definitively-registered mobile terminal 60 is not present.

In step ST4, the authentication ECU 19 serving as the terminal verifying unit 73 may determine whether the mobile terminal 60 whose terminal identification information is registered in the terminal information memory 86 is verified.

For example, the authentication ECU 19 may receive the terminal information of the mobile terminal 60 communicable with the communication device 35 from the communication ECU 20 via the vehicle network 26. The authentication ECU 19 may receive, as the terminal information, the terminal identification information registered in the terminal-side memory 63 of the mobile terminal 60. In one example, the terminal identification information may be encoded with use of the terminal key registered in the mobile terminal 60 at this time.

In a case where the authentication ECU 19 cannot receive the terminal information or in a case where the received terminal information does not match the terminal information registered in the terminal information memory 86, the authentication ECU 19 may determine that the mobile terminal 60 is unverified (step ST4: N). In this case, the authentication ECU 19 may bring the update process on the wireless key memory 81 illustrated in FIG. 5 to an end because the matching mobile terminal 60 is unverified. In a case where the received terminal information is encoded with use of the terminal key of the mobile terminal 60, the terminal verifying unit 73 may decode the terminal information with use of the information in the terminal key definitive memory 84 in order to determine whether the received terminal information matches the terminal information registered in the terminal information memory 86. After the decoding, the authentication ECU 19 may determine whether the terminal key of the mobile terminal 60 and the terminal key in the terminal key definitive memory 84 match each other.

In a case where the received terminal information matches the terminal information registered in the terminal information memory 86, the authentication ECU 19 may determine that the mobile terminal 60 is verified (step ST4: Y). In one example, upon this determination, the authentication ECU 19 may determine that the mobile terminal 60 is verified in a case where the received terminal information matches the terminal information registered in the terminal information memory 86 and the terminal key of the mobile terminal 60 also matches the terminal key in the terminal key definitive memory 84. In this case, the authentication ECU 19 may cause the process to a memory update process in step ST5 because the already-registered mobile terminal 60 is confirmed instead of the key device 50.

In a case where the authentication ECU 19 determines that the mobile terminal 60 is unverified, the authentication ECU 19 may bring the update process on the wireless key memory 81 illustrated in FIG. 5 to an end.

In step ST5, the authentication ECU 19 serving as the memory updating unit 72 may execute a process corresponding to the request for updating confirmed in step ST1.

For example, the authentication ECU 19 may thereby delete all pieces of key identification information from the wireless key memory 81. This may format the wireless key memory 81. The wireless key memory 81 may now be able to allow for registration of key identification information of a new key device 50 by the external device coupled to the vehicle network 26, for example.

Figure 6:
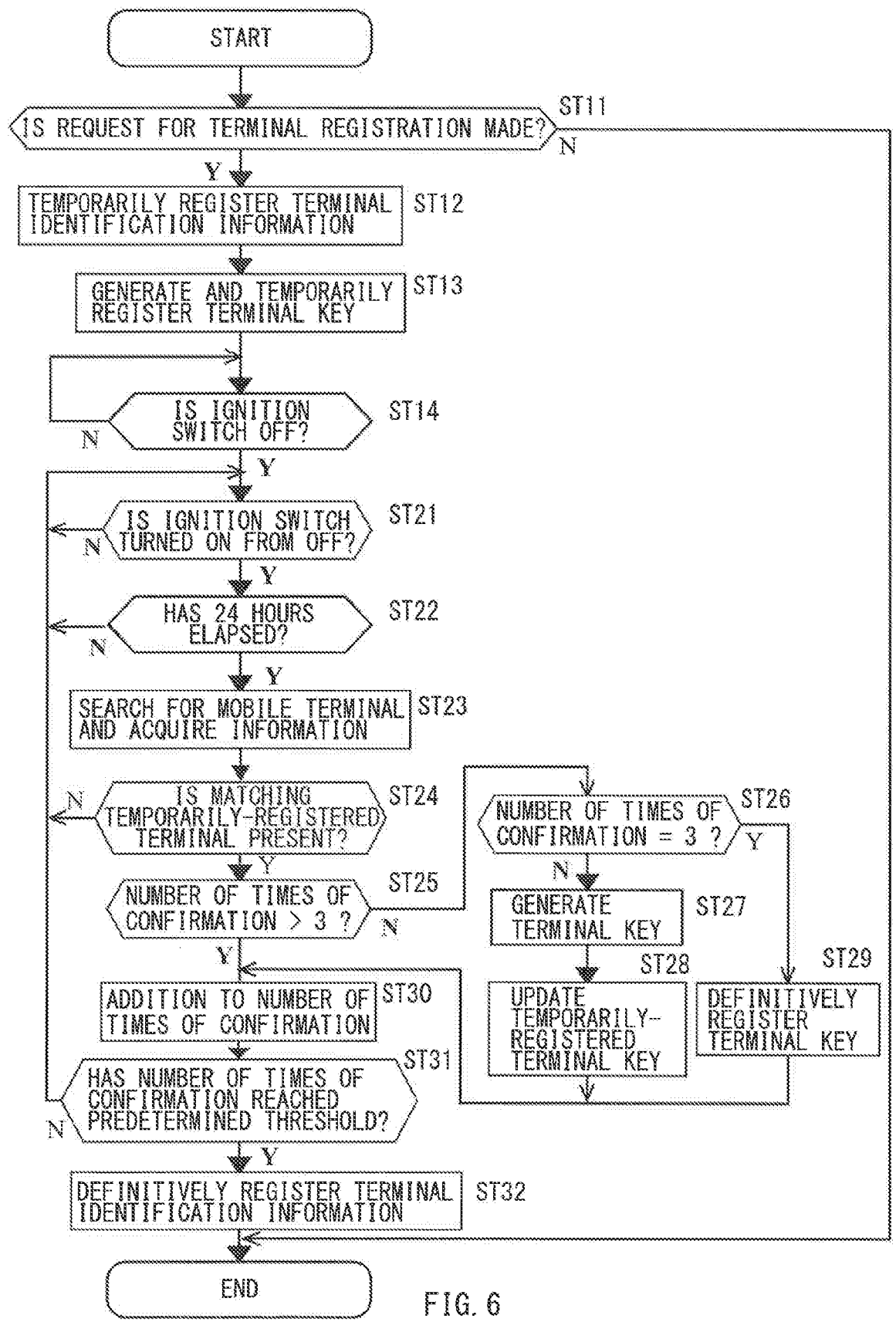
FIG. 6 is an explanatory diagram illustrating an example of a definitive registration process of a mobile terminal and a terminal key to be mainly executed by a terminal registering unit illustrated in FIG. 4.

FIG. 6 illustrates an example of a definitive registration process of the mobile terminal 60 and the terminal key to be executed mainly by the terminal registering unit 74 illustrated in FIG. 4.

The definitive registration process illustrated in FIG. 6 may be executed by the authentication ECU 19. In one embodiment, the authentication ECU 19 may serve as the terminal registering unit 74 and the key generating unit 75 illustrated in FIG. 4.

In step ST11, the authentication ECU 19 serving as the terminal registering unit 74 may determine whether a request for terminal registration is made.

For example, the authentication ECU 19 may determine that the request for terminal registration is made in a case where the request for terminal registration is acquired from the external device coupled to the vehicle network 26 or in a case where the request for terminal registration is made by the already-registered mobile terminal 60 (step ST11: Y). In this case, the authentication ECU 19 may cause the process to proceed to step ST12.

Otherwise, the authentication ECU 19 may determine that the request for terminal registration is not made (step ST11: N), and bring the definitive registration process illustrated in FIG. 6 to an end.

In step ST12, the authentication ECU 19 serving as the terminal registering unit 74 may temporarily register, in the terminal information temporary memory 83, the terminal identification information of the mobile terminal 60 used by the user of the automobile 1.

In step ST13, the authentication ECU 19 serving as the key generating unit 75 may generate a new terminal key. The authentication ECU 19 may temporarily register the generated terminal key in the terminal-side memory 63 of the mobile terminal 60. A temporary terminal key may be thereby registered in the terminal-side memory 63 of the mobile terminal 60. Further, the authentication ECU 19 may register, in the terminal key temporary memory 85, the terminal key temporarily registered in the mobile terminal 60.

In step ST14, the authentication ECU 19 serving as the terminal registering unit 74 may determine whether an ignition switch of the automobile 1 is OFF. In a case where the ignition switch is not OFF (step ST14: N), the authentication ECU 19 may repeat the process in step ST14. In a case where the ignition switch is OFF (step ST14: Y), the authentication ECU 19 may cause the process to proceed to step ST21.

The authentication ECU 19 may temporarily register, in the terminal information memory 86, the information of the mobile terminal 60 used by the user of the automobile 1 by the processes described above. Thereafter, the authentication ECU 19 may perform processes in step ST21 and in subsequent steps to execute a process of definitively registering, in the terminal information memory 86, the information of the mobile terminal 60 used by the user of the automobile 1.

In step ST21 directed to definitive registration, the authentication ECU 19 serving as the terminal registering unit 74 may determine whether the ignition switch is turned ON from OFF. In a case where the ignition switch is not turned ON from OFF (step ST21: N), the authentication ECU 19 may repeat the process in step ST21. In a case where the ignition switch is turned ON from OFF (step ST21: Y), the authentication ECU 19 may cause the process to proceed to step ST22. The ignition switch may be operated upon starting or stopping of the automobile 1.

In step ST22, the authentication ECU 19 serving as the terminal registering unit 74 may determine whether twenty-four hours have elapsed since the latest update to the number of times of confirmation. In one example, the authentication ECU 19 may acquire an elapsed time measured by the timer 43 to determine whether twenty-four hours have elapsed since the latest update to the number of times of confirmation. In a case where twenty-four hours have not been elapsed yet from the latest update (step ST22: N), the authentication ECU 19 may cause the process to return to step ST21. In a case where twenty-four hours have already been elapsed from the latest update (step ST22: Y), the authentication ECU 19 may cause the process to proceed to step ST23. The authentication ECU 19 may thereby execute a plurality of times of matching determination regarding the mobile terminal 60 at a predetermined time interval.

In one example, the authentication ECU 19 may count, instead of acquiring the elapsed time, the number of times that the ignition switch is turned ON from OFF and determine whether the number of times that the ignition switch is turned ON from OFF is a predetermined number or more. In a case where the number of times that the ignition switch is turned ON from OFF is the predetermined number or more, the authentication ECU 19 may cause the process to proceed to step ST23.

In step ST23, the authentication ECU 19 serving as the terminal registering unit 74 may search for the mobile terminal 60 and receive information regarding the mobile terminal 60.

In step ST24, the authentication ECU 19 serving as the terminal registering unit 74 may determine whether the mobile terminal 60 whose information the terminal registering unit 74 has received is temporarily registered.

For example, the authentication ECU 19 may receive terminal information of the mobile terminal 60 communicable with the communication device 35 from the communication ECU 20 via the vehicle network 26. As the terminal information, the authentication ECU 19 may receive the terminal identification information and the terminal key registered in the terminal-side memory 63 of the mobile terminal 60. The authentication ECU 19 may determine that the mobile terminal 60 whose information the authentication ECU 19 has received is temporarily registered in a case where the received terminal information matches the terminal information registered in the terminal information memory 86 and the received terminal key also matches the terminal key in the terminal key temporary memory 85. For example, the authentication ECU 19 may receive the terminal information which is encoded in the mobile terminal 60 with use of the terminal key that has been supplied to the mobile terminal 60 and registered in the terminal-side memory 63 in advance. Further, the authentication ECU 19 may decode the received terminal identification information with use of the terminal key registered in the terminal information memory 86. In a case where the decoded terminal information matches the terminal information registered in the terminal information memory 86 in advance, the authentication ECU 19 may determine that the mobile terminal 60 whose information the authentication ECU 19 has received is temporarily registered. In this case, the authentication ECU 19 may determine that matching is obtained regarding both the terminal information and the terminal key in a case where the decoding is successful. The matching determination in step ST4 illustrated in FIG. 5 may be also performed in a similar manner.

In a case where the authentication ECU 19 cannot receive the terminal information or in a case where the received terminal information does not match the terminal information temporarily registered in the terminal information memory 86, the authentication ECU 19 may determine that the mobile terminal 60 is not temporarily registered (step ST24: N). In this case, the authentication ECU 19 may cause the process to return to step ST21 because the temporarily-registered mobile terminal 60 is not present.

Otherwise, that is, in a case where the received terminal information matches the terminal information temporarily registered in the terminal information memory 86, the authentication ECU 19 may determine that the mobile terminal 60 is temporarily registered (step ST24: Y), and cause the process to proceed to step ST25.

In step ST25, the authentication ECU 19 serving as the terminal registering unit 74 may determine whether the number of times the authentication ECU 19 has already confirmed the mobile terminal 60 is greater than a predetermined threshold. In one non-limiting example, the predetermined threshold may be three. In a case where the number of times the authentication ECU 19 has already confirmed the mobile terminal 60 is greater than the predetermined threshold (step ST25: Y), the authentication ECU 19 may cause the process to proceed to step ST30. Otherwise (step ST25: N), the authentication ECU 19 may cause the process to proceed to step ST26.

In step ST26, the authentication ECU 19 serving as the terminal registering unit 74 may further determine whether the number of times the authentication ECU 19 has already confirmed the mobile terminal 60 is the same as the predetermined threshold. In a case where the number of times the authentication ECU 19 has already confirmed the mobile terminal 60 is smaller than the predetermined threshold (step ST26: N), the authentication ECU 19 may cause the process to proceed to step ST27. In a case where the number of times the authentication ECU 19 has already confirmed the mobile terminal 60 is the same as the predetermined threshold (step ST26: Y), the authentication ECU 19 may cause the process to proceed to step ST29.

In step ST27, the authentication ECU 19 serving as the key generating unit 75 may generate a new terminal key.

In step ST28, the authentication ECU 19 serving as the key generating unit 75 may temporarily register the generated terminal key in the terminal-side memory 63 of the mobile terminal 60. The temporary terminal key registered in the terminal-side memory 63 of the mobile terminal 60 may be thereby updated. Further, the authentication ECU 19 may perform updating on the terminal key temporary memory 85 with use of the terminal key newly temporarily registered in the terminal-side memory 63 of the mobile terminal 60. The authentication ECU 19 may thereby be allowed to newly generate the terminal key and perform updating for at least a plurality of times (twice, in this example) from the first time of the plurality of times of confirmation of the mobile terminal 60. The authentication ECU 19 may generate a terminal key and perform updating at the same time and in parallel subsequently after the process of matching determination of the mobile terminal 60. The terminal key may be updated every time when the mobile terminal 60 is confirmed. Thereafter, the authentication ECU 19 may cause the process to proceed to step ST30.

In step ST29, the authentication ECU 19 serving as the terminal registering unit 74 may definitively register the terminal key that has been temporarily registered in each of the mobile terminal 60 and the terminal information memory 86. The authentication ECU 19 may receive the temporary terminal key temporarily registered in the mobile terminal 60 and register the received terminal key in the mobile terminal 60 as the definitively-registered terminal key. Further, the authentication ECU 19 may acquire the temporary terminal key temporarily registered in the terminal key temporary memory 85, and register the acquired terminal key in the terminal key definitive memory 84 as the definitively-registered terminal key. The authentication ECU 19 may thereby be allowed to register the definitively-registered terminal key in the terminal key definitive memory 84 and the mobile terminal 60 that has been properly confirmed for a plurality of times. As a result, the authentication ECU 19 may be allowed to definitively register the terminal key of the mobile terminal 60 in the terminal information memory 86 in a case where, after the issue of the terminal key, the terminal key received from the mobile terminal 60 matches the temporary terminal key registered in the terminal key temporary memory 85 a plurality of times. Thereafter, the authentication ECU 19 may cause the process to proceed to step ST30.

In step ST30, the authentication ECU 19 serving as the terminal registering unit 74 may update the number of times of confirmation of the mobile terminal 60. The authentication ECU 19 serving as the terminal registering unit 74 may add 1 (one) to the number of times of confirmation of the mobile terminal 60.

In step ST31, the authentication ECU 19 serving as the terminal registering unit 74 may determine whether the number of times of confirmation of the mobile terminal 60 has reached a predetermined threshold. The threshold in this case may be, for example but not limited to, seven. In a case where the number of confirmation of the mobile terminal 60 has not reached the threshold (step ST31: N), the authentication ECU 19 may cause the process to return to step ST21. In a case where the number of times of confirmation of the mobile terminal 60 has reached the threshold (step ST31: Y), the authentication ECU 19 may cause the process to proceed to step ST31.

In step ST32, the authentication ECU 19 serving as the terminal registering unit 74 may definitively register the terminal identification information of the mobile terminal 60 which has already undergone the predetermined threshold of times of confirmation. The authentication ECU 19 may register, in the terminal information definitive memory 82, the terminal identification information temporarily registered in the terminal information temporary memory 83. The authentication ECU 19 may be thereby allowed to definitively register the terminal identification information of the mobile terminal 60 in the terminal information memory 86 for matching by the memory updating section 72 in a case where the terminal information received from the mobile terminal 60 matches the terminal information that has been registered in the terminal information memory 86 a plurality of times.

In the present example embodiment, the terminal identification information of the mobile terminal 60 used by the user separately from the key device 50 may be registered in the terminal information memory 86. Further, upon performing updating on the wireless key memory 81 that is provided in the automobile 1 and in which the key identification information of the key device 50 of the automobile 1 is registered, the memory updating unit 72 may verify the mobile terminal 60 against the terminal identification information registered in the terminal information memory 86. This allows the memory updating unit 72 to execute the verification process at the time of updating on the wireless key memory 81 with the mobile terminal 60 whose terminal identification information is registered in the terminal information memory 86 also in a case where the key device 50 whose key identification information has been registered in advance in the wireless key memory 81 is not present.

The user is allowed to register the key identification information of the new key device 50 in the wireless key memory 81 by means of verification of the mobile terminal 60 which the user uses separately from the plurality of key devices 50 provided together with the automobile 1 also in a case where the user has lost all of the plurality of key devices 50 provided together with the automobile 1. The user need not to replace the wireless key apparatus 40 in order to allow for registration of the key identification information of the new key device 50 in the wireless key memory 81.

In addition, in the present example embodiment, terminal identification information of a mobile terminal 60 which the user has not been used together with the key device 50 is not to be registered in the terminal information memory 86. A person who tries to re-register a wireless key to steal the automobile 1 cannot register a new key device 50 in the wireless key memory 81 unless the person further steals the already-registered mobile terminal 60 from the proper user.

According to the present example embodiment, it is possible to further improve friendliness to the proper user who has used the key device 50 while securing high security against a person, other than the proper user, who has not used the key device 50 as described above.

According to the present example embodiment, the terminal key to be transmitted from the communication device 35 to the mobile terminal 60 and to be registered may be acquired, and the acquired terminal key may be registered in the terminal information memory 86. Further, in a case where, after the issue of the terminal key, a terminal key received from the mobile terminal 60 matches the terminal key already registered in the terminal information memory 86, the terminal identification information of the mobile terminal 60 may be definitively registered in the terminal information memory 86, according to the present example embodiment. Further, the mobile terminal 60 communicating with the communication device 35 upon the updating of the wireless key memory 81 may be verified with use of the terminal identification information registered in the terminal information memory 86 and the terminal key registered in the terminal information memory 86, according to the present example embodiment. Therefore, the terminal identification information of the mobile terminal 60 is not allowed to be definitively registered in the terminal information memory 86 even if the terminal identification information of the mobile terminal 60 matches the terminal identification information registered in the terminal information memory 86 but unless the terminal key of the mobile terminal 60 matches the terminal key generated by the wireless key apparatus 40 of the automobile 1. A person who has stolen the mobile terminal 60 of the user cannot definitively register a new key device 50 in the wireless key memory 81 unless the terminal key of the mobile terminal 60 is determined as matching the terminal key generated by the wireless key apparatus 40 of the automobile 1 even in a case where the person who has stolen the mobile terminal 60 has been using the mobile terminal 60.

According to the present example embodiment, when the ignition switch is operated upon starting or stopping of the automobile 1, the authentication ECU 19 may execute a process of acquiring the terminal key at the same time or approximately the same time and in parallel subsequently after the authentication ECU 19 serving as the terminal registering unit 74 performs the process of matching determination.

Therefore, for example, upon starting of the automobile 1 for the first time, a terminal key may be issued for the unregistered mobile terminal 60 and the terminal key may be registered in the mobile terminal 60. In this process, the authentication ECU 19 serving as the terminal registering unit 74 cannot make determination regarding matching because the mobile terminal 60 is not registered.

Upon starting of the automobile 1 for the second time thereafter, the terminal key that has been issued upon the starting of the automobile 1 for the first time has been registered in the mobile terminal 60. Therefore, the authentication ECU 19 serving as the terminal registering unit 74 may be allowed to determine matching regarding the already-issued terminal key to verify the mobile terminal 60.

In this case, in order to allow for updating on the wireless key memory 81, the user may have to start the automobile 1 at least twice. The mobile terminal 60 may be registered as a verified device allowing for updating on the wireless key memory 81 through a period including at least two times of starting of the automobile 1.

A person who tries to perform updating on the wireless key memory 81 by verification of the mobile terminal 60 to steal the automobile 1 is not allowed to update the wireless key memory 81 immediately.

In contrast, the proper user of the automobile 1 continues to use the automobile 1 with use of the properly-registered key device 50 of the automobile 1. Through the usual use of the automobile 1 by the user, the mobile terminal 60 of the proper user of the automobile 1 is allowed to be registered as the verified device allowing for updating on the wireless key memory 81. The proper user of the automobile 1 does not have to take much trouble to register the mobile terminal 60. Further, in a case where the proper user loses the key device 50 after the mobile terminal 60 has been registered, the user is allowed to perform updating on the wireless key memory 81 with use of the already-registered mobile terminal 60 of his/her own. It can be expected that the mobile terminal 60 of the proper user of the automobile 1 is registered as the verified device allowing for updating on the wireless key memory 81 by the time when the proper user of the automobile 1 loses all of the plurality of key devices 50 provided together with the automobile 1.

According to the present example embodiment, the authentication ECU 19 serving as the terminal registering unit 74 may definitively register the terminal identification information of the mobile terminal 60 in the terminal information memory 86 to allow for verification by the memory updating unit 72 in a case where the terminal key of the mobile terminal 60 matches the terminal key registered in the terminal information memory 86 a plurality of times. The matching of the terminal key of the mobile terminal 60 and the terminal key registered in the terminal information memory 86 may be determined in a case where decoding of the terminal identification information that is received from the mobile terminal 60 and is encoded with use of the terminal key of the mobile terminal 60 is successful with use of the terminal key registered in the terminal information memory 86 a plurality of times. This prevents the terminal identification information of the mobile terminal 60 from being definitively registered in the terminal information memory 86 to allow for the verification by the memory updating unit 72 until the terminal key of the mobile terminal 60 is determined to match the terminal key registered in the terminal information memory 86 a plurality of times. In one example embodiment, the authentication ECU 19 serving as the terminal registering unit 74 may execute the above-described determination regarding matching a plurality of times at a predetermined time interval. Accordingly, it takes a long time to allow the terminal identification information to be registered.

According to the present example embodiment, the authentication ECU 19 serving as the key generating unit 75 may newly generate a terminal key a plurality of times and update the terminal key to be used for verification of the mobile terminal 60. The generated terminal key may be transmitted from the communication device 35 to the mobile terminal 60 and registered. In one example embodiment, the authentication ECU 19 serving as the key generating unit 75 may generate a new terminal key at least two or more times including the first time of the plurality of times of matching determination performed by the terminal registering unit 74. The authentication ECU 19 serving as the key generating unit 75 may thereby update the terminal key to be registered in the mobile terminal 60.

This makes it possible to further improve security according to the present example embodiment.

According to the present example embodiment, the number of times of the determination regarding matching before the terminal registering unit 74 definitively registers, in the terminal information memory 86, the terminal identification information temporarily registered in the mobile terminal 60 to allow for verification by the memory updating unit 72 may differ from the number of times of the determination regarding matching before the terminal registering unit 74 definitively registers the terminal key temporarily registered in the mobile terminal 60 and the terminal information memory 86.

The difference in the number of times of the determination regarding matching makes it more difficult to determine the determination regarding matching for which time relates to the timing at which the terminal key is fixed as a result of the definitive registration of the terminal key. For example, even in a case where the terminal keys are decoded by continuously intercepting the plurality of terminal keys supplied from the wireless key apparatus 40 to the mobile terminal 60 and analyzing the intercepted terminal keys, it is difficult to determine which of the plurality of terminal keys is used for the definitive registration only on the basis of the decoded terminal keys.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

Each of the driving ECU 11, the steering ECU 12, the braking ECU 13, the automatic-driving and drive-assist ECU 14, the driving operation ECU 15, the detection ECU 16, the air conditioning ECU 17, the door ECU 18, the authentication ECU 19, the communication ECU 20, and the UIECU 21 illustrated in FIG. 1, and the authentication unit 71, the memory updating unit 72, the terminal verifying unit 73, the terminal registering unit 74, and the key generating unit 75 illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the driving ECU 11, the steering ECU 12, the braking ECU 13, the automatic-driving and drive-assist ECU 14, the driving operation ECU 15, the detection ECU 16, the air conditioning ECU 17, the door ECU 18, the authentication ECU 19, the communication ECU 20, and the UIECU 21 illustrated in FIG. 1, and the authentication unit 71, the memory updating unit 72, the terminal verifying unit 73, the terminal registering unit 74, and the key generating unit 75 illustrated in FIG. 4. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the driving ECU 11, the steering ECU 12, the braking ECU 13, the automatic-driving and drive-assist ECU 14, the driving operation ECU 15, the detection ECU 16, the air conditioning ECU 17, the door ECU 18, the authentication ECU 19, the communication ECU 20, and the UIECU 21 illustrated in FIG. 1, and the authentication unit 71, the memory updating unit 72, the terminal verifying unit 73, the terminal registering unit 74, and the key generating unit 75 illustrated in FIG. 4.

The invention claimed is:

1. A vehicle wireless key apparatus included in a vehicle, the vehicle wireless key apparatus comprising:
    an interface configured to wirelessly communicate with a wireless key to allow the wireless key to remotely control a function of the vehicle through the vehicle wireless key apparatus, and further configured to wirelessly communicate with a mobile terminal;
    a wireless key memory storing key identification information of the wireless key, the key identification information in the wireless key memory being used to verify that the wireless key accessing the vehicle wireless key apparatus has a same key identification information;
    a terminal information memory storing terminal identification information of the mobile terminal, the terminal identification information in the terminal information memory being used to verify that the mobile terminal accessing the vehicle wireless key apparatus has a same terminal identification information;
    at least one processor; and
    at least one machine readable non-transitory tangible medium that stores instructions that, when executed by the at least one processor, cause the at least one processor to perform update of the key identification information in the wireless key memory,
    wherein when the at least one processor receives a request for the update of the key identification information and verifies that the mobile terminal has the same terminal identification information as that in the terminal information memory, the at least one processor updates the key identification information in the wireless key memory without the wireless key that has the same key identification information as that in the wireless key memory.

2. The vehicle wireless key apparatus according to claim 1, wherein
    the at least one processor performs a key generation process, the key generation process including generating a terminal key that is to be registered in the mobile terminal and the terminal information memory, and
    the at least one processor performs a terminal registration process, the terminal registration process including (1) when receiving, from the mobile terminal, the terminal identification information encoded with the terminal key in the mobile terminal, decoding the received terminal identification information with the terminal key registered in the terminal information memory, (2) performing matching determination determining that the terminal key in the mobile terminal and the terminal key in the terminal information memory match in a case where the decoding is successful, and (3) registering the terminal identification information of the mobile terminal in the terminal information memory in a case where the terminal key in the mobile terminal and the terminal key in the terminal information memory match.

3. The vehicle wireless key apparatus according to claim 2, wherein the at least one processor executes the key generation process in association with the terminal registration process when starting or stopping the vehicle.

4. The vehicle wireless key apparatus according to claim 3, wherein
    the at least one processor executes the key generation process a plurality of times in association with the terminal registration process when starting or stopping the vehicle, and
    the at least one processor generates a new terminal key to update the terminal key registered in the mobile terminal and update the terminal key registered in the terminal information memory, every time the key generation process is performed.

5. The vehicle wireless key apparatus according to claim 2, wherein
    the at least one processor performs the matching determination a plurality of times,
    the terminal identification information of the mobile terminal is first temporarily registered in the terminal information memory,
    the at least one processor definitively registers, in the terminal information memory, the terminal identification information of the mobile terminal temporarily registered in the terminal information memory in a case where the at least one processor determines m-th times (m: positive integer) that the terminal key in the mobile terminal and the terminal key in the terminal information memory match, and
    the terminal identification information definitively registered in the terminal information memory is used when the at least one processor verifies whether the mobile terminal has the same terminal identification information as that in the terminal information memory.

6. The vehicle wireless key apparatus according to claim 5, wherein the at least one processor executes the matching determination the plurality of times at a predetermined time interval.

7. The vehicle wireless key apparatus according to claim 5, wherein
the terminal key is temporarily or definitively registered in each of the mobile terminal and the terminal information memory,
the at least one processor performs the matching determination the plurality of times on a basis of the terminal identification information, and
the at least one processor definitively registers the terminal key temporarily registered in each of the mobile terminal and the terminal information memory in a case where the at least one processor determines first n-th times (n: positive integer) in the plurality of times that the terminal key in the mobile terminal and the terminal key in the terminal information memory match.

8. The vehicle wireless key apparatus according to claim 6, wherein
the terminal key is temporarily or definitively registered in each of the mobile terminal and the terminal information memory,
the at least one processor performs the matching determination the plurality of times on a basis of the terminal identification information, and
the at least one processor definitively registers the terminal key temporarily registered in each of the mobile terminal and the terminal information memory in a case where the at least one processor determines first n-th times (n: positive integer) in the plurality of times that the terminal key in the mobile terminal and the terminal key in the terminal information memory match each other.

9. The vehicle wireless key apparatus according to claim 7, wherein m is different from n.

10. The vehicle wireless key apparatus according to claim 8, wherein m is different from n.

11. A vehicle wireless key apparatus included in a vehicle, the vehicle wireless key apparatus comprising:
an interface configured to wirelessly communicate with a wireless key to allow the wireless key to remotely control a function of the vehicle through the vehicle wireless key apparatus, and further configured to wirelessly communicate with a mobile terminal;
a wireless key memory storing key identification information of the wireless key, the key identification information in the wireless key memory being used to verify that the wireless key accessing the vehicle wireless key apparatus has a same key identification information;
a terminal information memory storing terminal identification information of the mobile terminal, the terminal identification information in the terminal information memory being used to verify that the mobile terminal accessing the vehicle wireless key apparatus has a same terminal identification information; and
circuitry configured to perform update of the key identification information in the wireless key memory,
wherein when the circuitry receives a request for the update of the key identification information and verifies that the mobile terminal has the same terminal identification information as that in the terminal information memory, the circuitry is configured to update the key identification information in the wireless key memory without the wireless key that has the same key identification information as that in the wireless key memory.

* * * * *